United States Patent [19]

Denning et al.

[11] 4,302,653

[45] Nov. 24, 1981

[54] METHOD AND APPARATUS FOR MONITORING AND CONTROLLING A RESISTANCE WELDING OPERATION

[75] Inventors: Erwin E. Denning, Clare; William L. Beltz, Harrison, both of Mich.

[73] Assignee: Weltronic Company, Southfield, Mich.

[21] Appl. No.: 136,813

[22] Filed: Apr. 2, 1980

[51] Int. Cl.³ .......................................... B23K 11/24
[52] U.S. Cl. .................................. 219/110; 219/111; 219/117.1
[58] Field of Search ............... 219/108, 109, 110, 111, 219/117.1

[56] References Cited

U.S. PATENT DOCUMENTS

| | | | |
|---|---|---|---|
| 3,518,399 | 6/1970 | Vanderhelst | 219/110 |
| 3,546,421 | 12/1970 | Meyer et al. | 219/110 |
| 3,573,421 | 4/1971 | Vanderhelst | 219/110 |
| 3,588,438 | 6/1971 | Vanderhelst | 219/110 X |
| 3,746,892 | 7/1973 | Petzold | 219/110 |
| 4,024,371 | 5/1977 | Drake | 219/110 |

FOREIGN PATENT DOCUMENTS

1309501 4/1975 United Kingdom ................ 219/110
1434349 5/1976 United Kingdom ................ 219/109

*Primary Examiner*—Gene Z. Rubinson
*Assistant Examiner*—Keith E. George
*Attorney, Agent, or Firm*—Harness, Dickey & Pierce

[57] ABSTRACT

A resistance welding controller for dynamically controlling both weld current and weld time in order to achieve a desired ΔR value. The resistance across the weld electrodes is monitored by the controller during the heat-up phase of the weld and compared to target values for minimum resistance (Rmin) and rate of resistance change (dR/dt). If the observed values for Rmim and dR/dt bear a predetermined relationship to the target values, a dynamic correction is made in the percentage heat control setting. The weld is then continued at the revised weld current level until the desired ΔR value is satisfied. If upon weld termination, the observed weld time is greater than the target weld time, an additional correction in weld current is made in preparation for the next weld. In addition, the controller is also adapted to detect newly dressed weld electrodes and automatically respond by reverting to the original weld schedule.

22 Claims, 11 Drawing Figures

METHOD AND APPARATUS FOR MONITORING AND CONTROLLING A RESISTANCE WELDING OPERATION

BACKGROUND AND SUMMARY OF THE INVENTION

The present invention relates to resistance welding controllers and in particular to a resistance welding controller that is adapted to monitor various parameters associated with the weld and dynamically control the welding current and weld time accordingly to achieve the desired weld.

With the increasingly widespread use of automated mechanisms, more commonly referred to as "robots", to perform welding operations, the need has arisen for more sophisticated welding controllers which are capable of consistently performing uniform high quality welds while operating unattended over extended periods of time, despite changes in such factors as line voltage, material thickness and electrode diameter. Moreover, in view of the time constraints imposed on assembly line operations, it is additionally important that automated welding controllers be able to consistently achieve the desired weld quality without significantly altering the target weld time.

It is well known in the resistance welding art that the quality of a weld is related to the change in resistance that occurs between the workpieces during the formation of the weld. This characteristic is referred to hereinafter as the $\Delta R$ value of the weld and refers to the percentage change in weld nugget resistance between the maximum resistance value experienced and the resistance value at weld termination. Accordingly, resistance welding controllers have been proposed which monitor the resistance between the weld electrodes and terminate the weld when a preselected $\Delta R$ value is sensed. An example of a welding control mechanism of this type is disclosed in U.S. Pat. No. 3,586,815.

The disadvantage with welding controllers of this type, however, is that weld quality is controlled solely by controlling weld time. Consequently, under certain conditions, such as with "mushrooming" electrodes, weld time may need to be significantly extended beyond the target weld time in order to achieve the desired $\Delta R$ value. This can present significant problems, particularly when operating under an assembly line production schedule. For example, with a target weld time of 15 cycles, a weld time of 20 cycles may be unacceptable.

Accordingly, it is the primary object of the present invention to provide a resistance welding controller that is adapted to monitor weld nugget resistance and dynamically control both weld current and weld time to achieve a desired $\Delta R$ value. In this manner, weld quality is maintained without significantly affecting weld time. Specifically, the present resistance welding controller is adapted to monitor weld nugget resistance values and rates of resistance change during the early stage or "heat-up" phase of the weld, and compare the sensed resistance characteristics to a predetermined target resistance curve. If the results of the comparisons indicate a projected weld time significantly greater than or less than the target weld time, then a dynamic change is made in weld current—i.e., percentage heat. With the correction in weld current made, the controller is then adapted to continue to monitor the weld nugget resistance and terminate the weld when the desired $\Delta R$ value has been satisfied. The following weld is then automatically initiated at the revised percentage heat setting and the target resistance curve is updated based upon the experience of the most recent successfully completed welds.

In addition, the resistance welding controller according to the present invention is further adapted to compare upon weld termination the actual weld time experienced with the target weld time and make an additional correction in weld current in preparation for the next weld if the weld was terminated either beyond or short of the target weld time. Thus, it will be appreciated that while weld time is still permitted to vary in order to satisfy the desired $\Delta R$ value, the changes in weld time are small due to the dynamic control of weld current.

Furthermore, the preferred embodiment of the present welding controller is also adapted to detect during the heat-up phase of the weld if the electrodes have been freshly dressed and respond by immediately reverting to the original weld schedule. In this manner, the necessity of having to re-initialize the welding controller each time the weld electrodes are serviced is avoided.

Additional objects and advantages of the present invention will become apparent from a reading of the detailed description of the preferred embodiment which makes reference to the following set of drawings in which:

BRIEF DESCRIPTION OF THE DRAWINGS

FIGS. 6a-6c are flowchart diagrams outlining the main control program for the microcomputer in the commander logic circuit.

DETAILED DESCRIPTION OF THE PREFERRED EMBODIMENT

Figure 1:
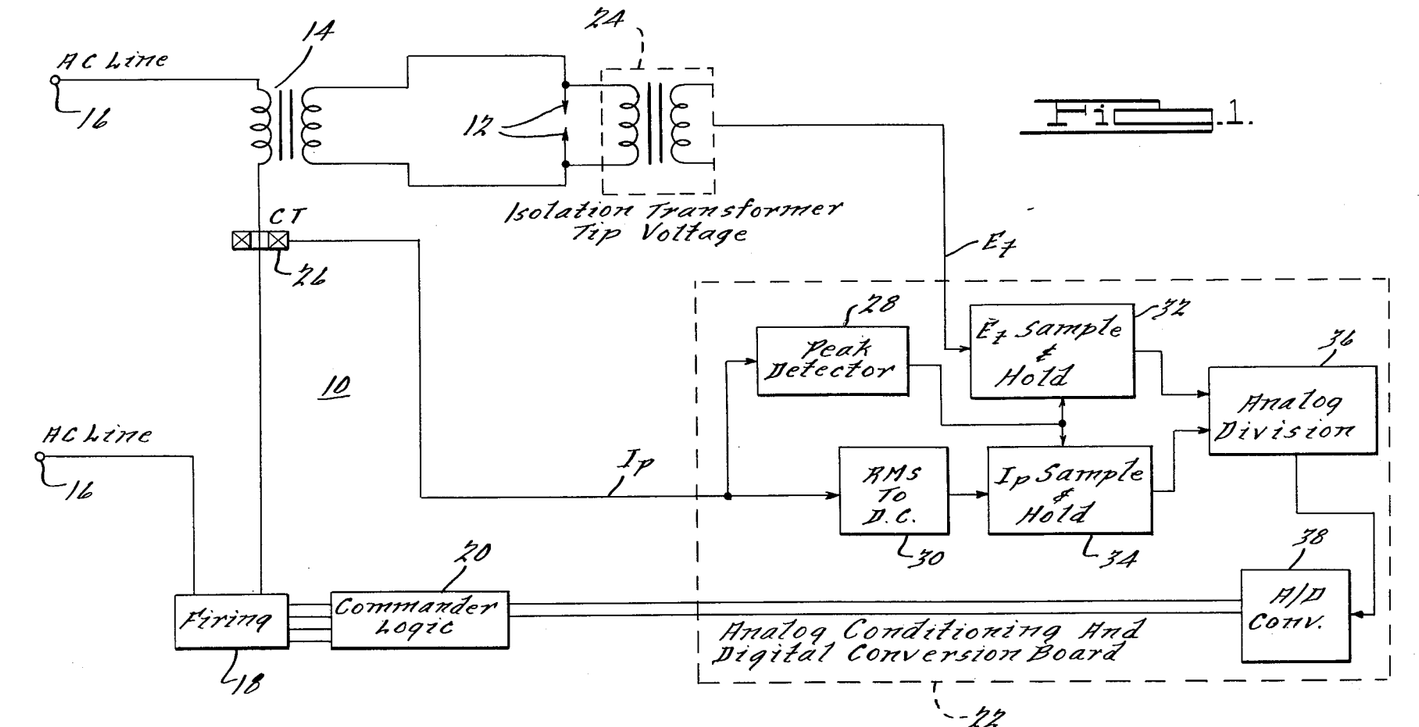
FIG. 1 is a block diagram of the welding controller according to the present invention.
Figure 5A:
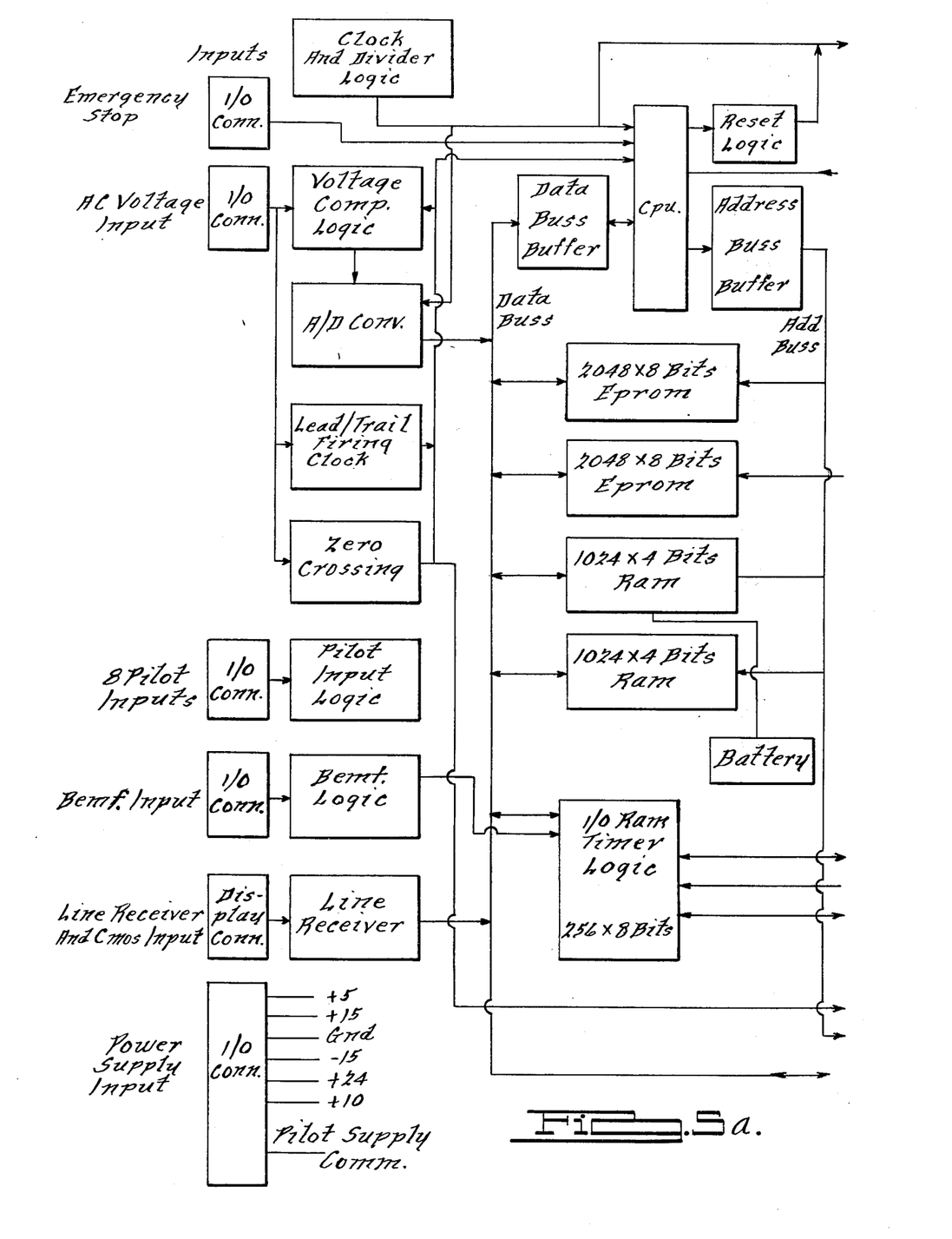
FIGS. 5a and 5b are a detailed block diagram of the commander logic circuit shown in FIG. 1.
Figure 5B:
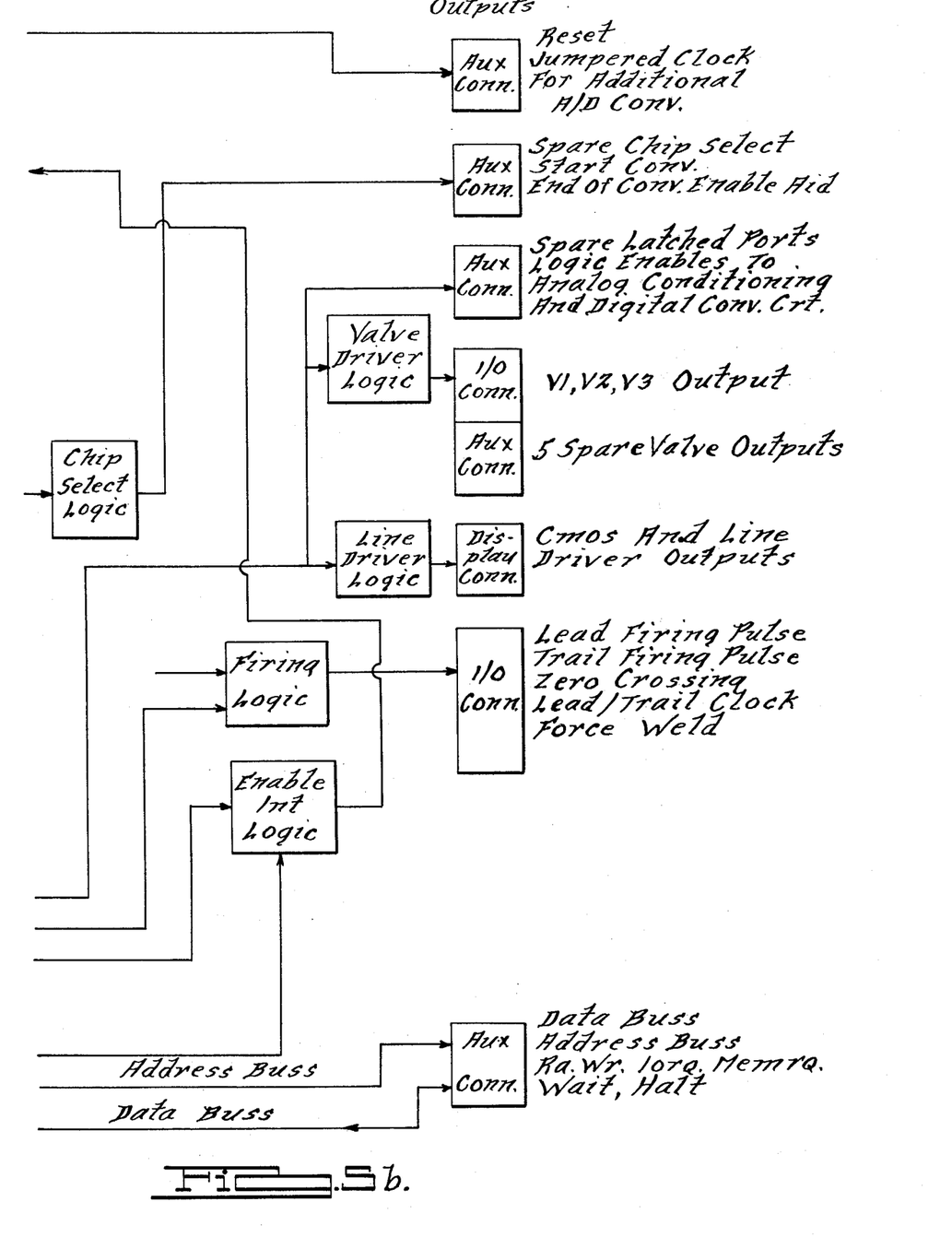
Figure 6B:
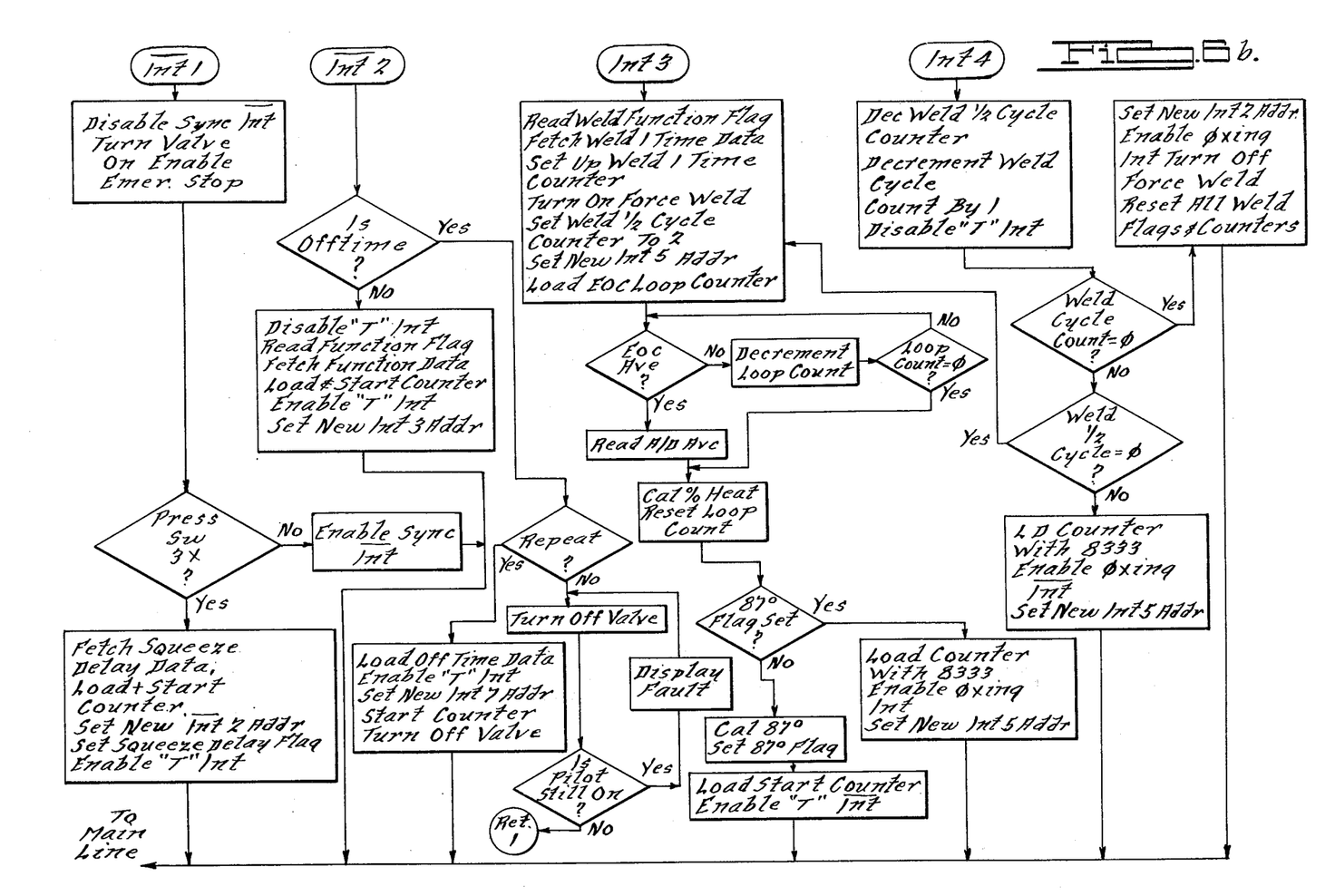
Figure 6C:
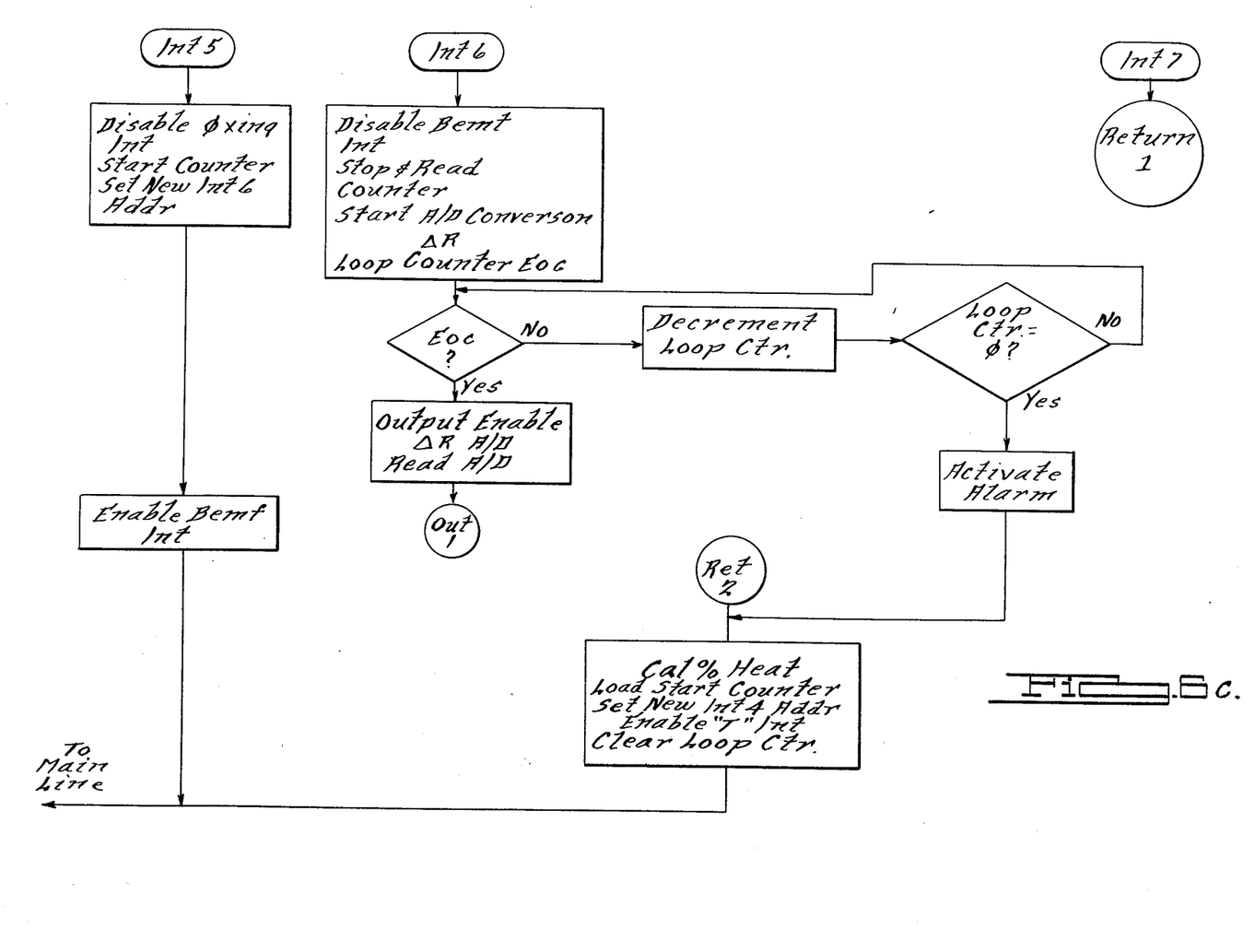
Figure 8A:
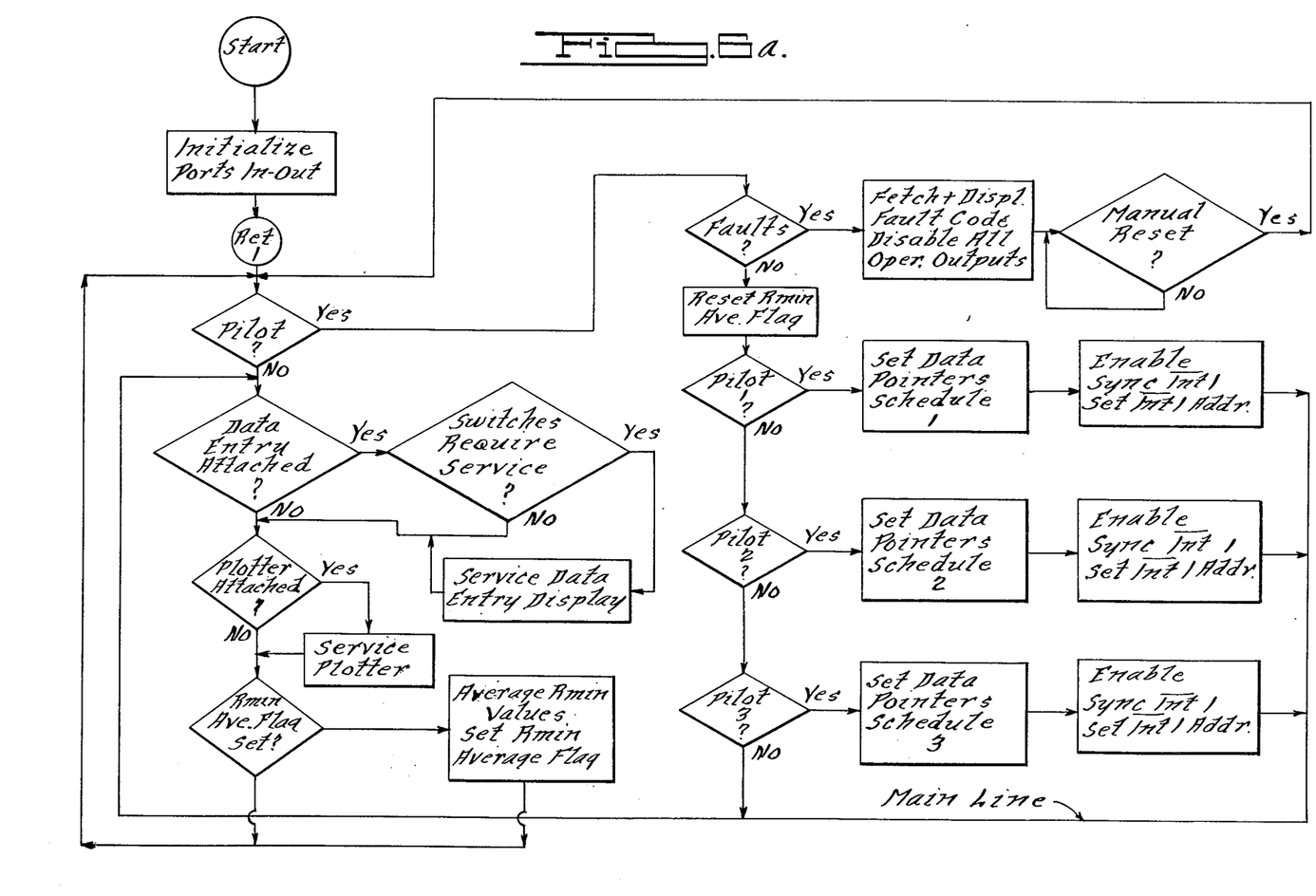

Referring to FIG. 1, a block diagram of a resistance welding controller 10 according to the present invention is shown. The welding controller 10 is adapted to control the application of electrical energy to the weld electrodes 12. The electrical energy for welding the workpieces together is provided to the weld electrodes 12 by a welding transformer 14 which has its primary winding connected to a suitable a.c. source 16 and its secondary winding connected across the weld electrodes 12. Energization of the primary winding of the transformer 14 is controlled by a conventional firing circuit 18 which is in turn controlled by the commander logic circuitry 20. In particular, the commander logic circuitry 20 is adapted to determine the amount of weld current to be applied to the welding transformer 14 in accordance with the percentage heat setting, the power factor of the load, and fluctuations in the line voltage, and control the firing angle of the SCRs in the firing circuit 18 accordingly. In addition, the commander logic circuitry 20 in the present invention is also adapted to dynamically control weld current in accordance with an analysis of weld nugget resistance values and rates of resistance change in a manner to be subsequently described in greater detail. However, since the only modification to the commander logic circuitry 20 necessitated by the present invention is the inclusion of additional software in the microcomputer which comprises the heart of the preferred embodiment of the commander logic circuit, details of its operation will not be described herein since the functions otherwise performed are conventional. A detailed block diagram of the commander logic circuitry is provided in FIGS. 5a and 5b, and a flowchart outlining the software for the main control program is provided in FIGS. 6a–6c.

The commander logic circuit 20 receives feedback signal information relating to the resistance across the weld electrodes 12 from an analog conditioning and digital conversion circuit 22. In particular, the analog conditioning and digital conversion circuit 22 is adapted to calculate the weld nugget resistance from the sensed voltage across the weld electrodes 12 and the weld current supplied to the primary winding of the welding transformer 14. The voltage across the electrodes 12 is sensed by an isolation transformer 24 which has its primary winding connected across the weld electrodes. A voltage signal proportional to the electrode or "tip" voltage is thereby produced in the secondary winding of isolation transformer 24, and is referred to as $E_t$. Weld current is sensed by a toroidal current sensing transformer 26 which is magnetically coupled to the primary winding of welding transformer 14. Consequently, the output signal produced by current sensing transformer 26 is proportional to the current flowing in the primary winding of welding transformer 14, and is referred to as $I_p$.

The output signal from the current sensing transformer 26 is provided to a peak detector circuit 28 which is adapted to detect when the current signal ($I_p$) is at its maximum amplitude. When the peak detector circuit 28 detects the peak in the current waveform, an output signal is produced which is provided to both a voltage ($E_t$) sample and hold circuit 32 and a current ($I_p$) sample and hold circuit 34. The $E_t$ sample and hold circuit 32 is adapted to sample the tip voltage signal ($E_t$) when enabled by the output from the peak detector circuit 28 and the $I_p$ sample and hold circuit is adapted to sample and weld current signal ($I_p$) when enabled by the output signal from the peak detector circuit 28. Because the value of the current signal from the output of the current sensing transformer 26 is a true RMS value, the current signal must first be converted to a corresponding analog dc signal by an RMS-to-DC converter 30 before being applied to the $I_p$ sample and hold circuit 34. The reason for sampling the voltage ($E_t$) and current ($I_p$) signals when the current is at a maximum is to provide a purely resistive indication of the impedance of the circuit, since the inductive portion of the impedance is eliminated when the rate of change of current with respect to time is zero.

The outputs from the $E_t$ and $I_p$ sample and hold circuits 32 and 34, which correspond to the sampled instantaneous values for $E_t$ and $I_p$, are provided to an analog division circuit 36 which is adapted to divide the analog value of the voltage signal ($E_t$) by the analog value of the current signal ($I_p$). The resulting analog signal which is proportional to the resistance (R) across the weld electrodes 12 is then converted to a corresponding digital signal by an analog-to-digital converter 38 and provided to the commander logic circuit 20.

Figure 2:
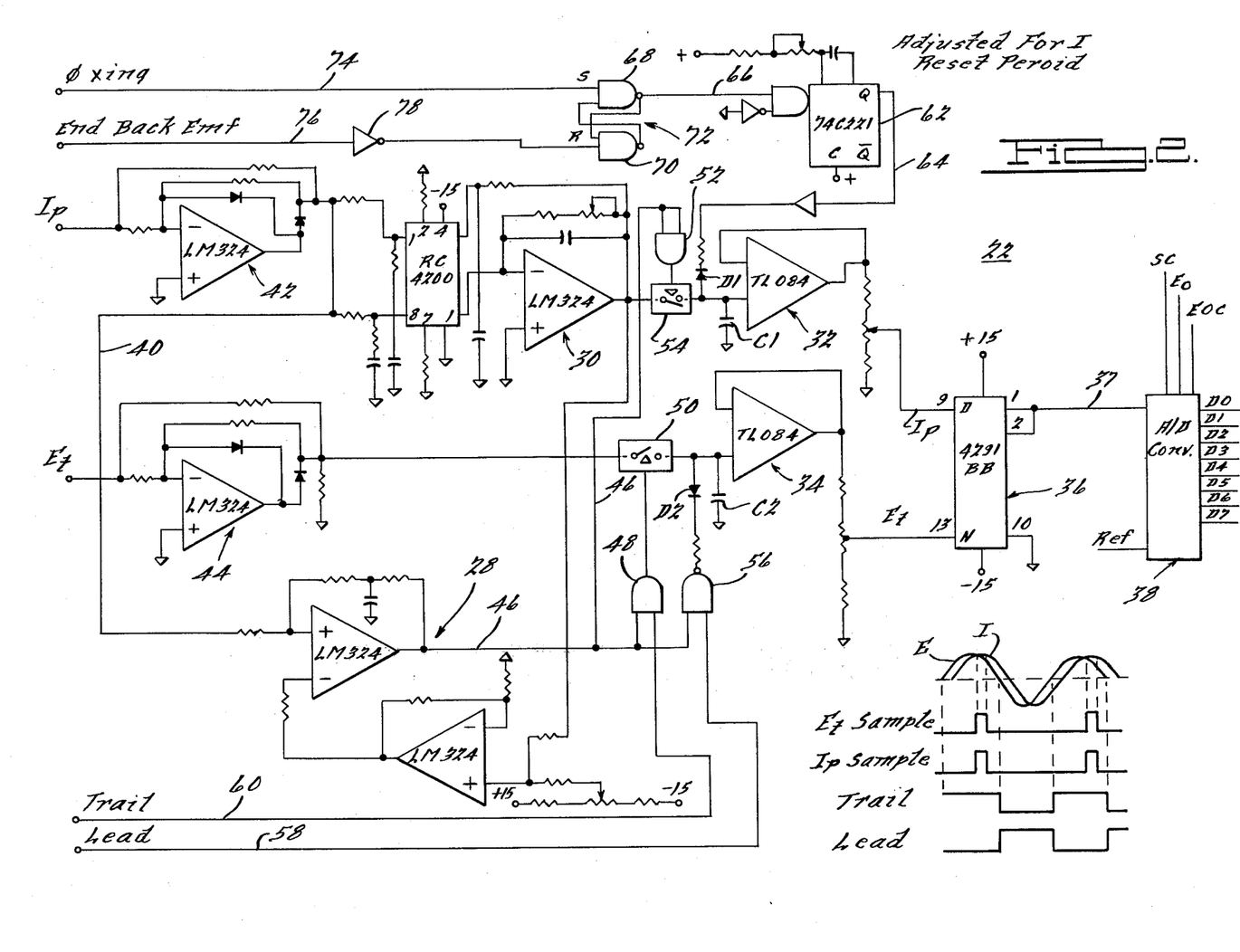
FIG. 2 is a circuit diagram of the analog conditioning and digital conversion circuitry shown in block diagram form in FIG. 1.

Turning now to FIG. 2, a circuit diagram of the analog conditioning and digital conversion circuit 22 is shown. The current signal ($I_p$) from the output of the current sensing device is provided through an absolute value detector circuit 42 on line 40 to the input of the peak current detector circuit 28. The voltage signal ($E_t$) from the output of the isolation transformer connected across the welding electrodes is similarly provided initially to an absolute value detector circuit 44. The output from the peak current detector circuit 28 is provided on line 46 to the inputs of a pair of AND gates 48 and 52 which have their outputs connected to the control terminals of a pair of analog switches, 50 and 54 respectively. The current signal on line 40 is also provided to the RMS-to-DC converter circuit 30 as previously described. Analog switch 54 is connected between the RMS-to-DC converter circuit 30 and the current sample and hold circuit 32. Similarly, analog switch 50 is connected between the output of absolute value detector circuit 44 and the voltage sample and hold circuit 34. Thus, it will be appreciated that the current sample and hold circuit 32 will sample the weld current signal ($I_p$) when analog switch 54 is rendered conductive and the voltage sample and hold circuit 34 will sample the tip voltage signal ($E_t$) when analog gate 50 is rendered conductive.

The conductive state of analog switch 50 is controlled by AND gate 48 which has its other input connected to the TRAIL pulse line 60. The LEAD and TRAIL pulses on lines 58 and 60 comprise square wave clock signals which are generated off the line voltage by the commander logic circuitry, and are used primarily as steering pulses to control the firing of the two SCRs in the firing circuit. The timing relationship between the a.c. line voltage waveform and the LEAD and TRAIL pulse signals is illustrated in the accompanying timing diagram. Thus, it will be appreciated that when the current waveform peak is detected by detector circuit 28 during the TRAIL period of the a.c. line voltage waveform, the output of AND gate 48 will go HI, thereby rendering conductive analog switch 50 and enabling the sample and hold circuit 34 to sample the instantaneous value of the tip voltage signal $E_t$. The voltage sample and hold circuit 34 is reset by discharging capacitor C2 through diode D2, which is connected to the output of a NAND gate 56. The output of NAND gate 56 will go LO to discharge capacitor C2 when the current waveform peak is detected during the LEAD portion of the a.c. line voltage waveform.

The conductive state of analog switch 54 is also controlled by the output from the peak current detector circuit 28 so that the current sample and hold circuit 32 will sample the instantaneous value of the weld current signal ($I_p$) at the same point in time that the tip voltage signal ($E_t$) is sampled. The current sample and hold circuit 32 is similarly reset by discharging capacitor C1 through diode D1, which is connected to the output of a one-shot device 62. One-shot device 62 is adapted to produce a reset pulse of predetermined duration on line 64 when enabled by a HI signal on line 66 from the output of an R-S flip-flop 72, comprised of NAND gates 68 and 70. The SET input (S) of R-S flip-flop 72 is connected to the "zero-crossing" signal line 74 and the RESET input (R) of R-S flip-flop 72 is connected through an inverter 78 to the "end back-EMF" signal line 76. A LO signal pulse is produced on line 74 by the commander logic circuit whenever the a.c. line voltage crosses zero. Line 76 is connected to the secondary winding of a back-EMF sensing transformer which has its primary winding connected across the anodes of the SCRs in the firing circuit. A HI signal is therefore produced on line 76 by the back-EMF sensing transformer at approximately the zero-crossing point of the current waveform when the conducting SCR stops conducting. Thus, it will be appreciated that R-S flip-flop 72 is set at the zero-crossing point of the voltage waveform and is reset at approximately the zero-crossing point of the current waveform.

The sampled instantaneous values for current ($I_p$) and voltage ($E_t$) from the outputs of sample and hold circuits, 32 and 34 respectively, are provided to the analog divider circuit 36 which divides the voltage value by the current value and produces an analog output signal on line 37 that is proportional to the resistance across the weld electrodes. The analog resistance signal (R) on line 37 is finally converted to an 8-bit parallel digital signal which is provided to the microcomputer in the commander logic circuit.

Figure 3:
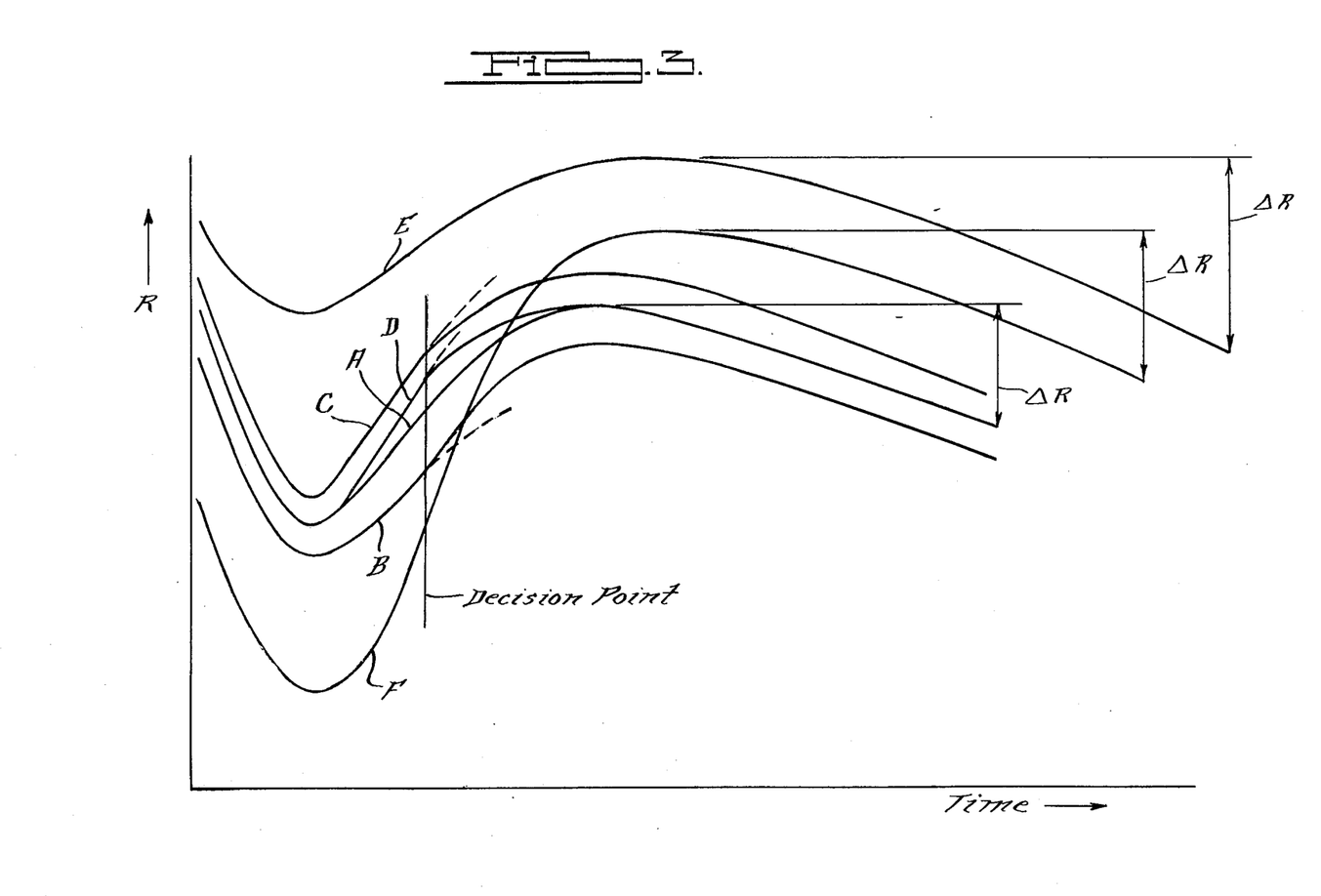
FIG. 3 is a graph of a plurality of example resistance curves plotted versus time to illustrate the operation of the resistance welding controller of the present invention.
Figure 4A:
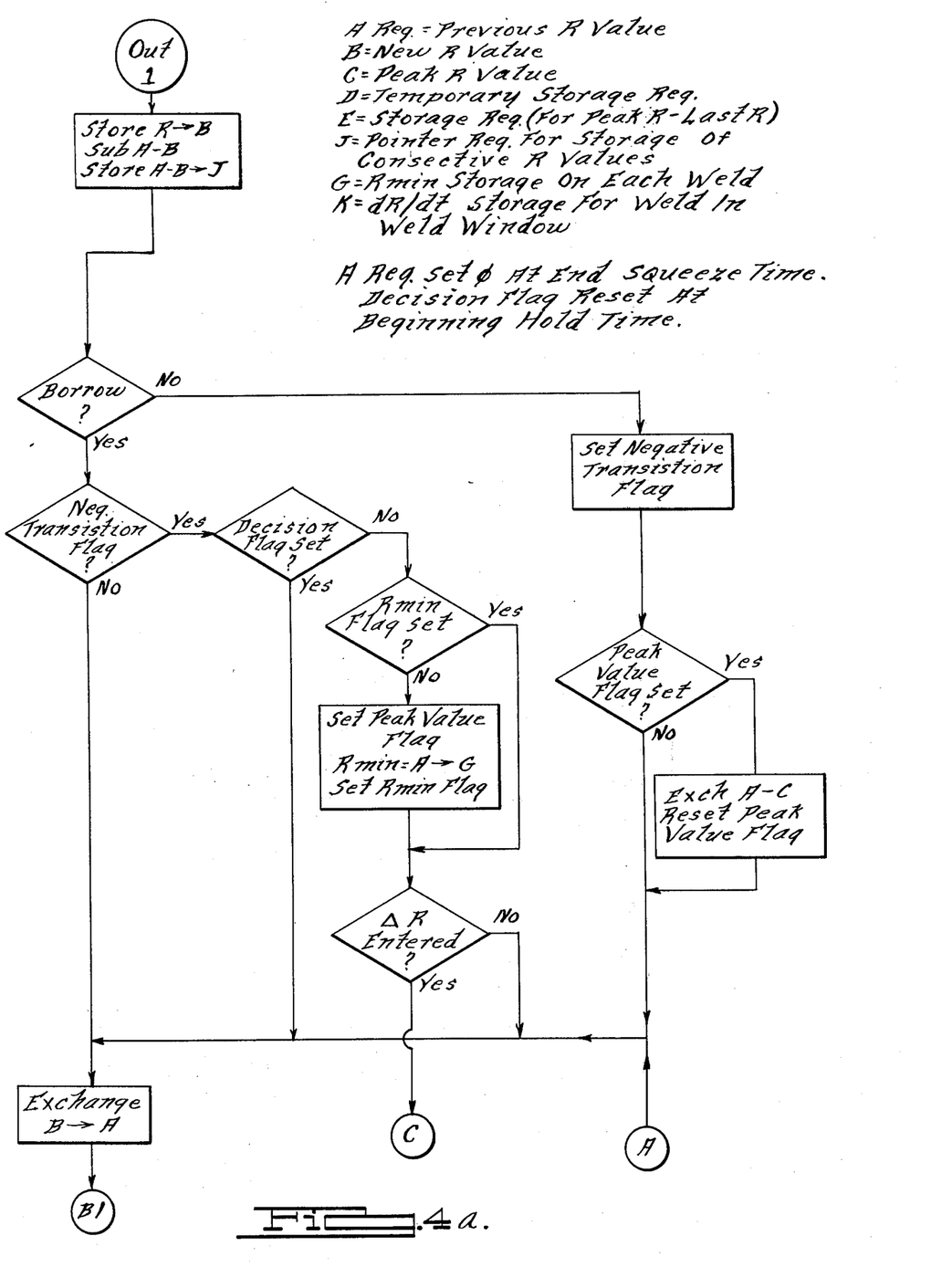
FIGS. 4a-4c are flowchart diagrams outlining the software utilized in the preferred embodiment of the commander logic circuit in the welding controller of the present invention.
Figure 4B:
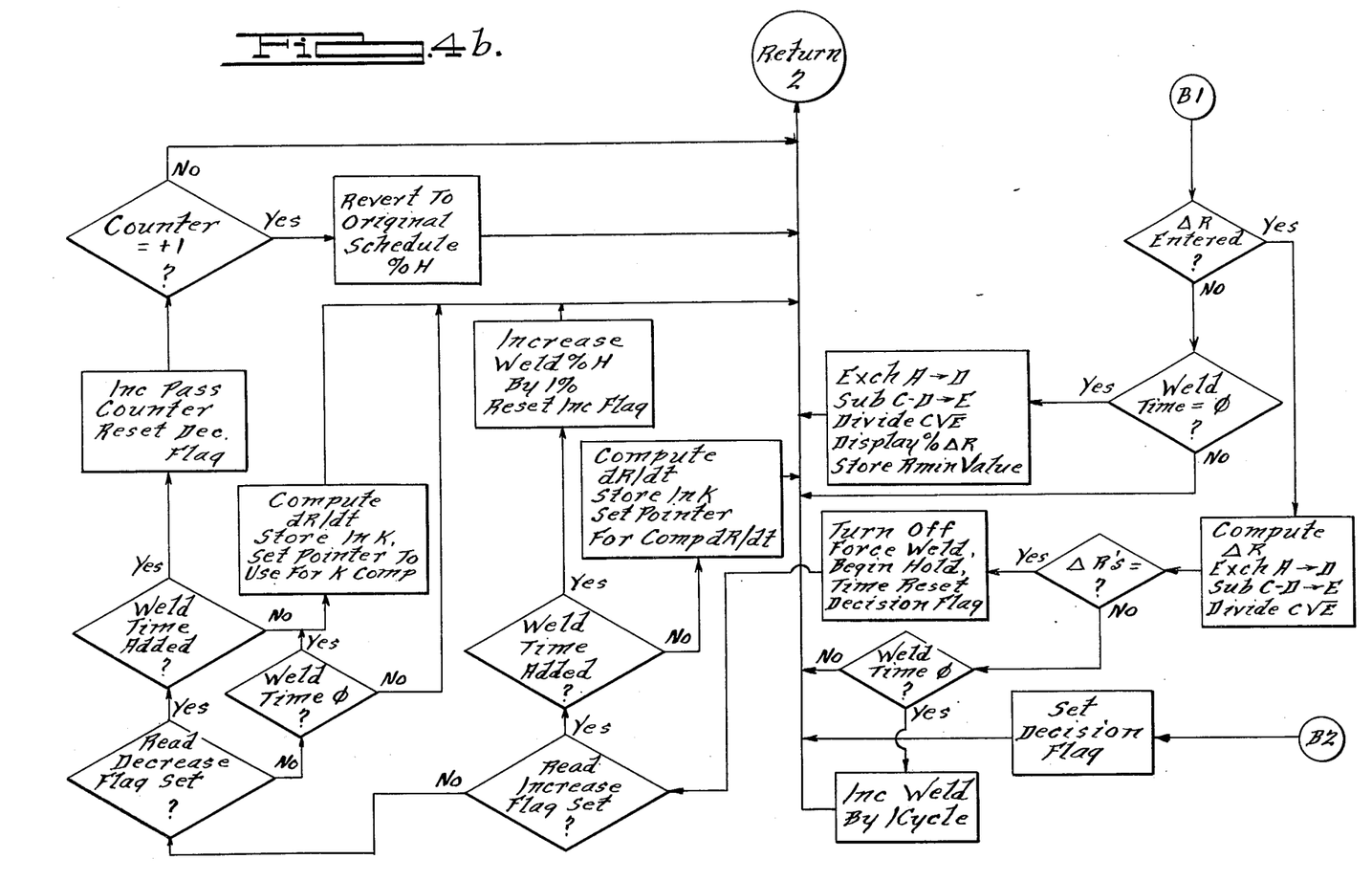
Figure 4C:
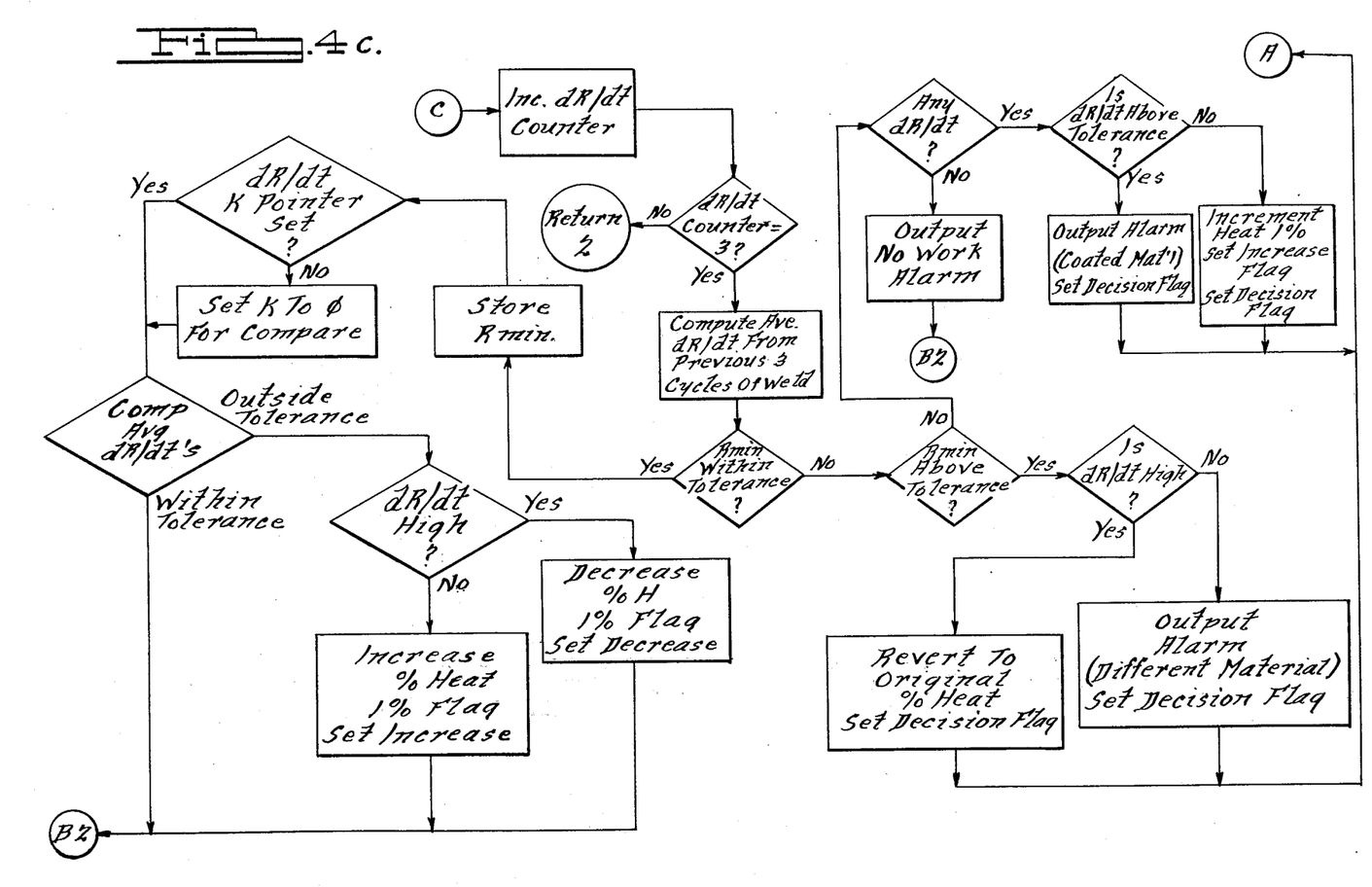

With particular reference to FIG. 3 and the flowchart diagrams in FIGS. 4a-4c, the method of dynamically controlling welding current and weld time according to the present invention will now be explained. FIG. 3 illustrates examples of various weld nugget resistance welding curves plotted against time. The differences between the curves have been exaggerated for illustration purposes. A typical weld nugget resistance curve is characterized by an initial decline in resistance from a high resistance value, determined primarily by the initial contact resistance as the weld electrodes squeeze the workpieces, to a minimum resistance value, hereinafter referred to by the designation "Rmin". Thereafter, the resistance curve rises as the workpieces are brought up to the melting temperature, and then gradually declines as the weld nugget is formed. The percentage drop in resistance which takes place during the growth of the weld nugget is referred to as the $\Delta R$ value of the weld.

It is well known in the resistance welding art that the quality of a weld is directly related to the $\Delta R$ value associated with the weld. Once the $\Delta R$ value of an optimum weld is known, it is therefore desirable to duplicate the $\Delta R$ value in subsequent welds. However, the percentage heat setting which initially produces an optimum weld will not continue indefinitely to produce welds of similar quality within the same weld time. Rather as the weld electrodes wear or "mushroom" from repeated use, the weld time necessary to achieve the desired $\Delta R$ value will gradually increase, given a constant heat setting, until the weld electrodes ultimately become so worn that the desired $\Delta R$ value can no longer be satisfied. When this condition occurs, the weld electrodes must either be dressed or replaced.

Automated welding operations, however, cannot generally tolerate wide variations in weld time. Rather, weld times must be maintained within relatively close tolerances in order to satisfy production schedules. Accordingly, the welding controller of the present invention is adapted to monitor the resistance curve during the initial heat-up phase of the weld process and dynamically change the welding current whenever a substantial variation in weld time is projected.

Specifically, the present welding controller operates in the following manner. Initially, a number of sample welds are run at various percentage heat and weld time settings. When operated in the manual mode, the controller is programmed to automatically determine the $\Delta R$ value observed for each sample weld and display the reading so that it can be logged along with the corresponding percentage heat and weld time values. Subsequent destructive tests on the weld samples are used to determine the best weld. The percentage heat, weld time, and $\Delta R$ values recorded for the best weld are then entered and stored in the controller. During the subsequent initial runs, the controller is programmed to monitor weld nugget resistance and determine the Rmin and dR/dt values associated with the resistance curve which achieves the desired $\Delta R$ and weld time values. These values for Rmin and dR/dt are then stored and serve as the target values.

Assuming that the solid resistance curve designated "A" in FIG. 3 represents the target resistance curve, the automatic operating mode of the present welding controller will now be explained. The initial weld is begun at the predetermined percentage heat setting. The welding controller is programmed to monitor the weld nugget resistance and detect the Rmin value. The observed Rmin value is then compared with the target Rmin value to determine whether it is within predefined tolerance limits of the target Rmin value. If the observed Rmin value falls within the tolerance "window" established, the controller is programmed to determine the dR/dt value of the resistance curve and adjust the percentage heat setting accordingly to correct for any variations from the target dR/dt value outside a predetermined tolerance. In the preferred welding controller, the dynamic corrections made in the percentage heat setting during the weld are limited to a one percent change when the observed Rmin value is within the tolerance limit established.

Once the decision concerning the need for a percentage heat correction has been made, the controller is then programmed to continue to monitor weld resistance and terminate the weld when the desired $\Delta R$ value is satisfied. Importantly, however, if a dynamic correction was made in the percentage heat setting during the course of the weld, the following weld will be started at the revised percentage heat setting. In addition, it will be noted from the flowchart diagrams in FIG. 4c and the main program in FIG. 6a, that the observed Rmin value, when within tolerance, is stored and subsequently averaged with the previous target Rmin value to establish a new Rmin target value prior to initiation of the next weld. Thus, it will be appreciated that the target Rmin value is updated after each "successful" weld to compensate for the gradual change which occurs in the resistance curves of successive welds due to normal electrode wear. However, as will subsequently be seen, when the observed Rmin value is outside the tolerance window, the weld conditions are presumed to be abnormal and the observed Rmin value is not stored and averaged.

This method of monitoring and controlling the weld when the observed Rmin value is within tolerance is illustrated by the example resistance curves designated "B" and "C" in FIG. 3. In example curve "B", the observed Rmin value is slightly below the desired Rmin value but within the predefined tolerance limits. Accordingly, when dR/dt is subsequently measured and compared to the target value for dR/dt, a one percent increase is immediately made in the percentage heat setting to bring the resistance curve in line with the target curve as shown. The controller then continues to monitor the resistance of the weld and terminates the weld when the desired $\Delta R$ value is satisfied. Similarly, in example curve "C", the observed Rmin value is slightly above the desired Rmin value but within the tolerance "window" established. Thus, a one percent decrease in the percentage heat setting is immediately made when the observed dR/dt value is determined to be greater than the desired dR/dt value. Thereafter, weld resistance is monitored and the weld terminated when the desired $\Delta R$ value is achieved. As previously indicated, the weld following each of the above two examples would automatically be initiated at the new percentage heat settings.

It is possible, however, that the dynamic correction made in weld current during the course of the weld will not be sufficient to achieve the desired weld quality within the targeted weld time. When this occurs, it may become necessary for the controller to extend slightly the weld time in order to satisfy the target $\Delta R$ value. However, to insure that such weld time excursions are not compounded through successive welds, the present welding controller is additionally adapted to make a second evaluation of the weld current setting after each weld is terminated. In particular, the welding controller is also programmed to compare upon weld termination the observed weld time with the target weld time. If the observed weld time exceeds the target weld time, an additional 1% increase will be made in the percentage heat setting in preparation for the next weld. Thus, it will be appreciated that in the preferred welding controller, if the observed Rmin value is within the tolerance window, then the greatest change that will be made in the percentage heat setting prior to initiation of the following weld is a 2% correction.

Under certain circumstances, such as when there is a substantial change in material thickness or after the weld electrodes have been dressed or replaced, a significant change in resistance values will take place causing the observed Rmin value to fall outside of the tolerance window. When this occurs, the controller presumes an abnormal weld condition. With particular reference to FIG. 4c, when Rmin is outside tolerance, the controller is programmed to first determine whether Rmin is above or below tolerance. If above tolerance, the controller then checks dR/dt to determine whether it is greater than or less than the target dR/dt value. If the observed dR/dt value is greater than the target dR/dt value, then the presumption is that the electrodes have been freshly dressed and the controller is programmed to immediately revert to the original weld schedule; i.e. the original target Rmin value and percentage heat setting. The controller will then continue as before to monitor weld resistance and terminate the weld when the desired $\Delta R$ value is satisfied. This operation is illustrated in FIG. 3 by the resistance curve labelled "D". Note, since the target value for Rmin will have gradually declined over time due to the gradual mushrooming of the electrodes, the observed value for Rmin after the electrodes are dressed will approximately coincide with the original target Rmin value (curve A) which is now above the tolerance limits of the most recent target Rmin value. Thus, curve D is illustrated in FIG. 3 as tracking the original target curve A until Rmin is reached. The observed dR/dt value for curve D will, however, be higher than the target dR/dt value following Rmin because the percentage heat, which has also gradually increased over the period of past welds, is now higher than the original percentage heat setting which produced the original target resistance curve A.

If, however, the observed dR/dt value is less than the desired dR/dt value, the presumption is that a different type of work material is present, and the controller is programmed to simply wait for the desired $\Delta R$ to be satisfied and activate an alarm. This operation is illustrated in FIG. 3 by the resistance curve labelled "E". Thus, it will be appreciated that the welding controller according to the present invention is capable of recognizing when the weld electrodes have been dressed and automatically responding by immediately reverting to the original weld schedule, thus avoiding the necessity of having to reinitialize the controller each time the weld electrodes are serviced.

Returning to the flowchart diagram in FIG. 4c, when the observed Rmin value is below tolerance, the controller is programmed to first determine if there exists a valid dR/dt value for the monitored resistance curve. If the curve is "flat", the presumption is that there is no workpiece present and the controller simply outputs an alarm signal. If a valid dR/dt value is present, however, the controller then determines if it is above or below tolerance. If the observed dR/dt value is below tolerance, the percentage heat setting is increased and the weld monitored until the desired $\Delta R$ value is satisfied. If, on the other hand, the observed dR/dt value is above tolerance, the presumption is that the work material is coated and the controller is again programmed to simply wait for the desired $\Delta R$ value to be satisfied before terminating the weld. This condition is illustrated in FIG. 3 by the resistance curve designated "F". It will be noted, however, that except for the situation when the original weld schedule is reverted to, the target Rmin value is not changed when the observed Rmin value falls outside of the tolerance window. In this manner, the target resistance curve will not be erroneously distorted based upon the experience of a single abnormal weld condition.

While the above description constitutes the preferred embodiment of the present invention, it will be appreciated that the invention is susceptible to modification, variation and change without departing from the proper scope or fair meaning of the accompanying claims.

What is claimed is:

1. In a resistance welding controller having means for monitoring the resistance across a pair of weld electrodes and means for controlling the application of welding current to the electrodes, the method of controlling the formation of a weld including the steps of:

establishing a target weld resistance curve characterized by a predetermined minimum resistance value (target Rmin) and a predetermined rate of increase in resistance value (target dR/dt) during the initial heat-up phase of the weld, a desired decline in resistance value during the nugget growth phase of the weld (desired $\Delta R$ value), and a target weld time;

monitoring the resistance of the weld and detecting the minimum resistance value (Rmin) of the weld and the subsequent rate of increase in resistance value (dR/dt) during the heat-up phase of the weld and comparing the observed values for Rmin and dR/dt with the target values for Rmin and dR/dt;

dynamically correcting during the heat-up phase of the weld the weld current applied to said electrodes in accordance with said comparison; and terminating the weld when the desired ΔR value is satisfied.

2. The method of claim 1 further including the step of utilizing the corrected weld current setting to initiate the following weld.

3. The method of claim 1 further including the step of comparing upon termination of the weld the actual weld time observed with the target weld time and altering the weld current setting accordingly in preparation for the start of the next weld.

4. The method of claim 1 further including the step of revising in preparation for the following weld the target Rmin value in accordance with the observed Rmin value.

5. The method of claim 4 wherein said observed Rmin value is averaged with the target Rmin value to establish a revised target Rmin value.

6. In a resistance welding controller having means for monitoring the resistance across a pair of weld electrodes and means for controlling the application of welding current to the electrodes; the method of controlling the formation of a plurality of successive welds in accordance with a target weld resistance curve that is characterized by a predetermined minimum resistance value (target Rmin) and a predetermined rate of increase in resistance value (target dR/dt) during the initial heat-up phase of the weld, a predetermined decline in resistance value (desired ΔR) during the nugget growth phase of the weld, and a target weld time, including the steps of:

(a) initiating a first weld at a first weld current setting, (b) monitoring the weld resistance of the weld and detecting the minimum resistance value (Rmin) of the weld and the subsequent rate of increase in resistance value (dR/dt) during the heat-up phase of the weld and comparing the observed values for Rmin and dR/dt with the target values for Rmin and dR/dt, (c) dynamically changing the weld current setting during the heat-up phase of the weld in accordance with said comparison, (d) terminating the weld when the desired ΔR value is satisfied, (e) initiating the succeeding weld at the revised weld current setting, (f) repeating steps (b)-(e) for each succeeding weld; and (g) automatically reverting to said first weld current setting during step (c) whenever the observed values for Rmin and dR/dt bear a predetermined relationship to the target values for Rmin and dR/dt.

7. The method of claim 6 further including the step of revising the target Rmin value in accordance with the most recent observed Rmin value prior to initiation of each succeeding weld if the difference between said observed Rmin value and said target Rmin value was within a predetermined tolerance.

8. The method of claim 7 wherein the original target Rmin value is also automatically reverted to whenever said first weld current setting is reverted to.

9. In a resistance welding controller having means for monitoring the resistance across a pair of weld electrodes and means for controlling the application of welding current to the electrodes, the method of controlling the formation of a weld including the steps of:

establishing a target weld resistance curve characterized by a predetermined minimum resistance value (target Rmin) and a predetermined rate of increase in resistance value (target dR/dt) during the initial heat-up phase of the weld, a desired decline in resistance value during the nugget growth phase of the weld, and a target weld time;

monitoring the resistance of the weld and detecting the minimum resistance value (Rmin) of the weld;

comparing the observed Rmin value with the target Rmin value and determining whether said observed Rmin value is within a predetermined range of said target Rmin value;

determining the rate of increase in resistance value (dR/dt) during the heat-up phase of the weld and comparing the observed dR/dt value with said target dR/dt value;

dynamically correcting during the heat-up phase of the weld the weld current applied to the electrodes in accordance with the comparison of said dR/dt values when said observed Rmin value is within said predetermined range of said target Rmin value; and continuing to monitor the resistance of the weld and terminating the weld when the desired ΔR value is satisfied.

10. The method of claim 9 further including the step of updating the target Rmin value in accordance with said observed Rmin value in preparation for the next weld if said observed Rmin value was within said predetermined range of said target Rmin value.

11. The method of claim 10 wherein said target Rmin value is updated by averaging said target Rmin value with said observed Rmin value.

12. The method of claim 9 including the step of utilizing the corrected weld current setting to initiate the following weld.

13. The method of claim 12 wherein said dynamic weld current correction comprises a change to a predetermined original weld current setting when said observed Rmin value is above said predetermined range of said desired Rmin value and said observed dR/dt value is greater than said target dR/dt value.

14. In a resistance welding controller having means for monitoring the resistance across a pair of weld electrodes and means for controlling the application of welding current to the electrodes, the method of controlling the formation of a weld including the steps of:

establishing a target weld resistance curve characterized by a predetermined minimum resistance value (target Rmin) and a predetermined rate of increase in resistance value (target dR/dt) during the initial heat-up phase of the weld, a desired decline in resistance value during the nugget growth phase of the weld (desired ΔR value), and a target weld time;

monitoring the resistance of the weld and detecting the minimum resistance value (Rmin) of the weld and the subsequent rate of increase in resistance value (dR/dt) during the heat-up phase of the weld and comparing the observed values for Rmin and dR/dt with the target values for Rmin and dR/dt;

dynamically correcting a first time during the heat-up phase of the weld the weld current applied to said electrodes in accordance with said comparisons;

terminating the weld when the desired ΔR value is satisfied;

comparing upon termination of the weld the actual weld time observed with said target weld time and making a second correction in the weld current setting in accordance therewith; and utilizing the twice corrected weld current setting to initiate the next weld.

15. The method of claim 14 wherein the step of dynamically correcting the weld current said first time comprises a reversion to a predetermined original weld current setting whenever the observed values for Rmin and dR/dt bear a predetermined relationship to the target values for Rmin and dR/dt.

16. A resistance welding controller for controlling the application of welding current to a pair of electrodes including voltage sensing means for sensing the voltage across the electrodes, current sensing means for sensing the weld current, and means responsive to said voltage sensing and current sensing means for producing an output signal proportional to the resistance across the electrodes; the improvement comprising:

control circuit means responsive to said output signal for controlling the application of welding current to the electrodes so as to achieve a desired decline in resistance value during the nugget growth phase of the weld (desired ΔR value) within a substantially uniform period of time (target weld time), including means for establishing a target resistance curve characterized by a minimum resistance value (target Rmin) and a rate of increase in resistance during the heat-up phase of the weld (target dR/dt), means for determining the minimum resistance value (Rmin) and rate of increase in resistance value (dR/dt) during the heat-up phase of subsequent welds and comparing the observed values for Rmin and dR/dt with said target values for Rmin and dR/dt, means for dynamically correcting the weld current setting during the heat-up phase of a weld in accordance with said comparisons, and means for terminating the weld when the desired ΔR value is satisfied.

17. The resistance welding controller of claim 16 wherein said control circuit means is further adapted to initiate each succeeding weld with the corrected weld current setting from the previous weld.

18. The resistance welding controller of claim 16 wherein said control circuit means further includes means for comparing upon termination of a weld the actual weld time with the target weld time and changing the weld current setting accordingly in preparation for the start of the next weld.

19. The resistance welding controller of claim 16 wherein said control circuit means further includes means for updating said target Rmin value in accordance with the most recent observed Rmin value.

20. The resistance welding controller of claim 16 wherein said control circuit means further includes means for causing said control circuit means to revert to a predetermined original weld current setting whenever the observed values for Rmin and dR/dt bear a predetermined relationship to said target values for Rmin and dR/dt.

21. In a resistance welding controller having means for monitoring the resistance across a pair of weld electrodes and means for controlling the application of welding current to the electrodes, the method of controlling the formation of a weld including the steps of:

establishing a desired decline in weld resistance during the nugget growth phase of the weld (desired ΔR value), and a target weld time;

initiating the weld at a predetermined weld current setting;

monitoring the resistance of the weld and terminating the weld when the desired ΔR value is satisfied; and comparing upon termination of the weld the actual weld time observed with said target weld time and adjusting accordingly said predetermined weld current setting in preparation for the start of the next weld.

22. The method of claim 21 wherein said predetermined weld current is increased such that percentage heat setting is increased by 1% in preparation for the next weld if the observed weld time exceeds said target weld time.

* * * * *

UNITED STATES PATENT AND TRADEMARK OFFICE
CERTIFICATE OF CORRECTION

PATENT NO. : 4,302,653
DATED : November 24, 1981
INVENTOR(S) : Erwin E. Denning et al It is certified that error appears in the above—identified patent and that said Letters Patent is hereby corrected as shown below:

In the Abstract, line 7, "Rmim" should be --Rmin--.

Claim 9, Column 10, Line 7, after "weld" insert --(desired $\Delta R$ value)--.

Signed and Sealed this

Ninth Day of February 1982

[SEAL]

Attest:

GERALD J. MOSSINGHOFF

Attesting Officer     Commissioner of Patents and Trademarks